July 4, 1967 C. LAUXEN 3,329,941

AIR BEARING DATA STORAGE APPARATUS

Filed Nov. 1, 1957 2 Sheets-Sheet 1

INVENTOR.
*Carl Lauxen*

BY [signature]

ATTORNEY.

July 4, 1967 C. LAUXEN 3,329,941

AIR BEARING DATA STORAGE APPARATUS

Filed Nov. 1, 1957 2 Sheets-Sheet 2

INVENTOR.
Carl Lauxen
BY
Morris [signature]
ATTORNEY.

United States Patent Office 3,329,941

Patented July 4, 1967

3,329,941

AIR BEARING DATA STORAGE APPARATUS

Carl Lauxen, Haddonfield, N.J., assignor to Radio Corporation of America, a corporation of Delaware Filed Nov. 1, 1957, Ser. No. 693,906
8 Claims. (Cl. 340—174.1)

This invention relates to data storage apparatus, and particularly to data storage apparatus of the magnetic type.

Magnetic drum and disc systems are extensively used for storing data. The data may be encoded in the form of discrete, electrical pulses or may be represented by continuous, time-varying, modulated signals. A narrow track or band of magnetizable material, carried by a movable member, is used for magnetically storing the data. A transducing means is magnetically coupled to the track of material for reading data from, or writing data onto, the magnetic material.

In certain prior systems, particularly drum systems, one or more transducing means is used for each separate track. In certain other prior systems, particularly disc systems, advantages are obtained by providing additional means for mechanically moving a single transducing means to scan different tracks. The tracks may be on the same movable member or on different movable members. Such positioning means are relatively expensive and complex, especially when high-speed operation and close tolerances are desired.

It is an object of the present invention to provide improved data storage apparatus of the scanning type which is relatively inexpensive and simple to construct.

Another object of the present invention is to provide an improved magnetic drum system using fewer transducing means than certain prior drum systems of similar type.

A further object of the present invention is to provide an improved magnetic storage apparatus having a relatively simple positioning means for positioning desired transducing means for coupling to desired ones of a plurality of separate tracks.

According to the present invention, a first member having magnetizable material thereon is mounted for rotation relative to another member and is supported by a thrust-bearing assembly. Means are provided for axially positioning the first member and the thrust-bearing assembly at any desired one of a plurality of locations relative to the other member. A transducing means mounted in the other member cooperates with a different track at each of the plurality of locations.

A feature of the invention resides in the provision of pressurized fluid, radial and thrust bearings between the fixed and the movable member, and between the movable member and the thrust-bearing assembly. The pressurized fluid bearings provide advantages, for example, in high-speed operation, in relatively close spacing between the transducing means and the magnetic material, and so on.

Figure 1:
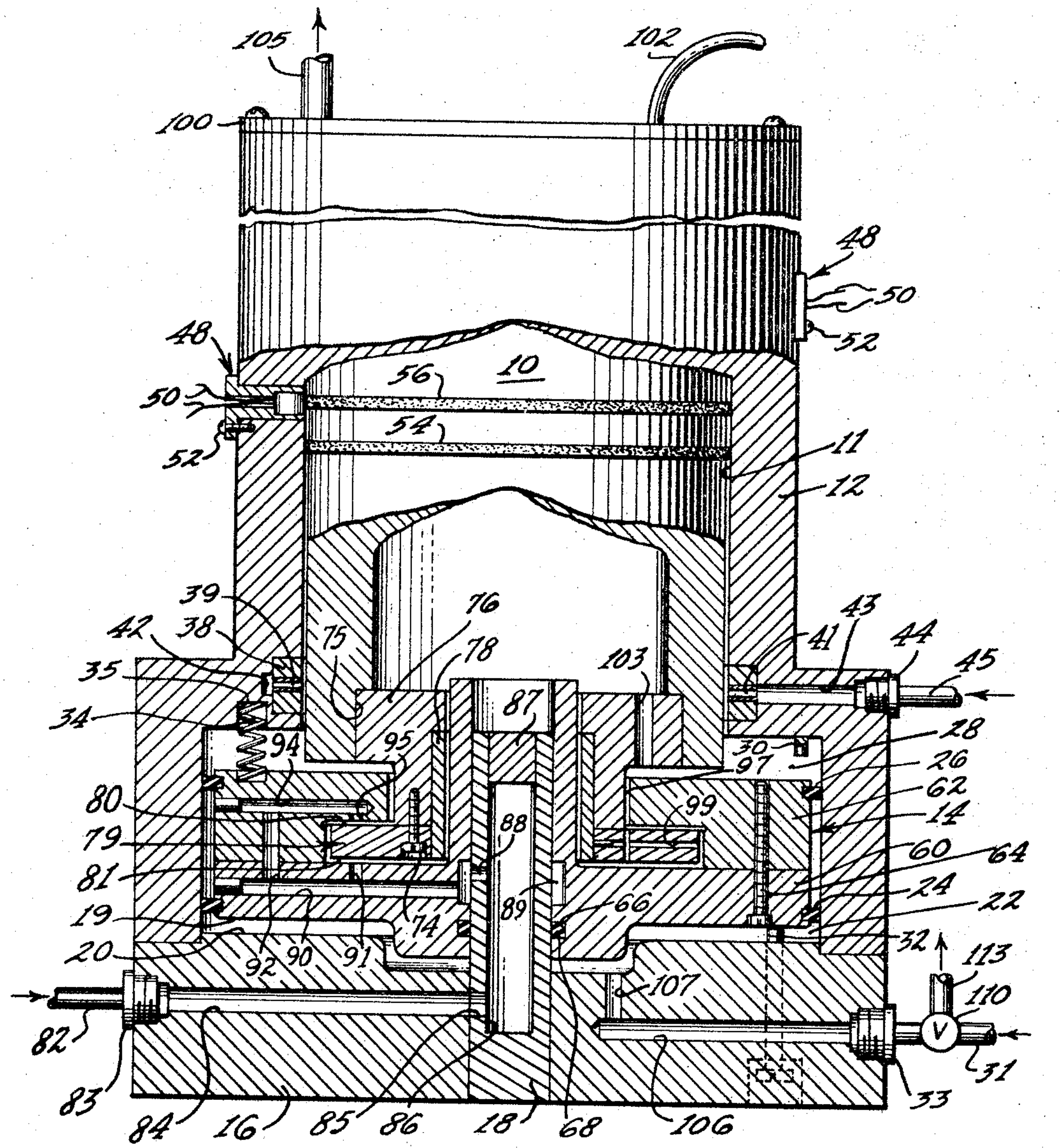
FIG. 1 is a partial elevational view including a cross-sectional view of the lower portion of a data storage apparatus according to the invention.
Figures 2, 3:
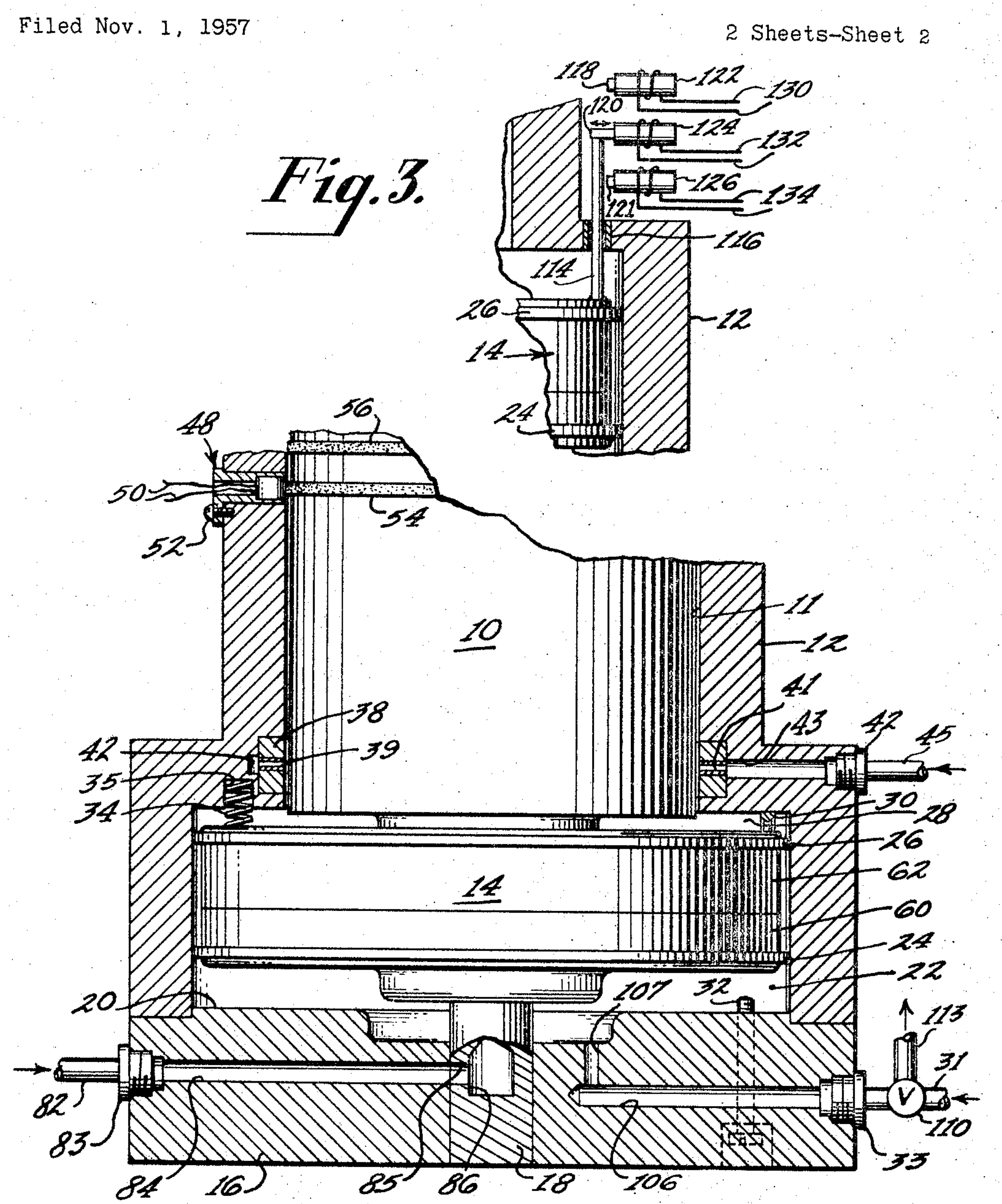
FIG. 2 is a partial elevational view, in cross-section, of the storage apparatus of FIG. 1.
FIG. 3 is a fragmentary, sectional view of a data storage apparatus using a movable pin for controlling the positioning of the shaft member.

In the embodiment of the invention exemplified in FIGS. 1 and 2, a drum-type storage apparatus is adapted for rotation about a vertical axis. The first member is provided by a cylindrical shaft 10 coated with a magnetizable material. The shaft 10 is mounted within a throughbore 11 of another member, such as a hollow sleeve member 12. The shaft 10 is supported at its lower end by a thrust-bearing assembly 14. The sleeve 12 and the shaft 10 are made from any suitable non-magnetic material such as aluminum. The shaft 10 may be hollow, as illustrated in FIG. 2, or solid.

The sleeve 12 is fixed at its lower end to a supporting base member 16 by any suitable means, such as screw means, not shown. The shaft 10 is rotatably mounted in a thrust-bearing assembly 14, as described more fully hereinafter. The thrust-bearing assembly 14 is slidably mounted upon an axial post 18. The axial post 18 is fixed, for example, as by a light, forcefit, in the base member 16. When assembled, the bottom wall 19 of the thrust-bearing assembly 14, and the top wall 20 of the base member 16, provide an expansible control chamber 22 for receiving pressurized fluid. The pressurized fluid, for example, may be compressed air or other gaseous mixtures. The pressurized fluid is supplied through suitable channeling in the base member 16, as described more fully hereinafter. Other channeling in the base member 16 provides pressurized fluid for the thrust-bearing assembly 14. A pair of flexible, ring-shaped gaskets 24 and 26 are attached to the outside shell of the thrust-bearing assembly 14 and are used to separate the control chamber 22 from an annular exhaust chamber 28 located between the upper surface of the thrust-bearing assembly 14 and the lower portion of the shaft 10.

A pair of limit stops restrict the maximum upward and downward movement of the thrust-bearing assembly 14. The upper-limit stop is provided by a pin 30 attached to and depending from the sleeve 12 within the exhaust chamber 28. The lower-limit stop is provided by a set screw 32 threaded through the base member 16 and extending into the control chamber 22.

A spring means 34 is fixed in a recess 35 in the sleeve member 12 and bears against the upper surface of the thrust-bearing assembly. In the absence of pressurized fluid in the control chamber 22, the spring means 34 maintains the thrust-bearing assembly 14 in the lower position against the lower-limit stop 32.

The radial bearing surface for the lower portion of the shaft 10 is provided by a circumferential insert 38 mounted in a recessed portion of the sleeve 12. Another circumferential insert, not shown, is similarly located in the upper portion of the sleeve 12 to provide an upper radial bearing surface. The shaft 10 is mounted within the sleeve 12 with only sufficient clearance to allow a thin film of pressurized fluid between the periphery of the shaft 10 and the radial journal bearing surfaces. The surface of the radial bearing insert 38 may be flush with the inside wall of the sleeve 12 or may project slightly into the throughbore 11. By "slightly" is meant a distance which provides a clearance in the order of 0.5 milli-inch between the inside wall of the sleeve 12 and the coating on the shaft 10. Alternatively, the inside wall of the sleeve 12 may itself provide the radial bearing surface for the shaft 10, as described in copending application filed by Martin L. Levene, et al., on Oct. 15, 1956, entitled Data Storage Apparatus, and bearing Ser. No. 615,813.

A plurality of orifices, such as the orifices 39 and 41, are provided in the radial bearing insert 38 to connect the radial space between the shaft 10 and the sleeve 12 to an annular relief chamber 42 in the sleeve 12. In practice, from eight to thirty-two orifices may be provided. A radial channel 43 in the sleeve 12 conducts pressurized fluid from an inlet port 44 to the relief chamber 42. The inlet port 44 is provided with a threaded opening for connection to any suitable means such as an air hose 45 or other conduit by which the pressurized fluid is introduced to the radial bearing space.

Transducing means 48 are fitted, as by a light-force fit, into apertures bored in the sleeve 12. The pole-piece tips of the transducing means 48 may be substantially flush with the inside wall of the sleeve 12. The transducing means 48 may be similar to the transducing means described in aforesaid copending application. A different pair of signal leads 50 is electrically coupled to each transducing means 48. Signals are applied to the signal leads 50 when information is written on, or read from, the magnetic coating on the shaft 10. A screw means 52 may be used in order to prevent rotation of a transducing means 48 within the sleeve 12. It is to be understood, however, that the screw means 52 is not necessary. In practice, the screw means 52 is used as an aid in withdrawing a transducing means 48 from the sleeve 12 during certain testing operations.

The transducing means 48 may be coupled to any desired one of a plurality of tracks indicated by the tracks 54 and 56 on the shaft 10. In one position of the thrust-bearing assembly 14, as shown in FIG. 1, the transducing means 48 is coupled to the uppermost track 56. In the other position, the transducing means 48 is coupled to the lowermost track 54, as shown in FIG. 2 of the drawing.

Three or more tracks, not shown, may be used for receiving information from, or transferring information to, the same transducing means 48 by providing means for positioning the thrust-bearing assembly at three or more positions. In practice, a plurality of transducing means are arranged in similar manner to the transducing means 48 for storing information at different positions along the length of the shaft 10. For convenience of drawing, only two of the transducing means 48 are shown. Each one of the transducing means 48 cooperates with a different pair of the tracks 54, 56, one at a time.

The arrangement of the shaft 10 for rotation within the thrust-bearing assembly 14, and details of the arrangement of the thrust-bearing assembly 14 and the channeling network therein, are shown in FIG. 1. For convenience of manufacture, the thrust-bearing assembly 14 is made of a lower piece 60 and an upper piece 62. The two pieces are fastened together by any suitable means such as a bolt 64 countersunk in the lower piece 60. A circular recess 66 is cut in the lower piece 60 to receive a flexible gasket 68 which bears against the annular post 18 to prevent the pressurized fluid from flowing to or from the expansible control chamber 22 along the surface of the post 18.

The shaft 10 has an annular recess 75 cut in its bottom portion to receive a cylindrical insert piece 76. The insert piece 76 is fastened to the shaft 10 by any suitable means, such as a light-force fit, obtained by slightly tapering the insert piece 76 in the axial direction from the bottom surface of the shaft 10. An annular recess is cut in the cylindrical insert 76 at its inside surface to receive a ring-shaped bearing piece 78 having a machined inside surface. The bearing piece 78 is used to center the cylindrical insert piece 76 and a thrust disc 79. The thrust-bearing surfaces 80 and 81 for the shaft 10 are provided by the thrust disc 79 which is attached to the cylindrical insert piece 76 by any suitable means, such as a bolt 74. The thrust disc 79 extends from the inside surface of the bearing insert 78 into an annular recess cut in the upper piece 62 of the thrust-bearing assembly 14. Only sufficient clearance is provided between the thrust disc 80 and the upper and lower thrust-bearing assembly pieces 62 and 60 to allow a thin film of pressurized fluid to flow through the thrust-bearing space.

Pressurized fluid from any suitable source, not shown, is introduced into the thrust-bearing spaces by a second hose 82, or other conduit, connected to a second inlet connector 83 in the base support 16. The inlet port 83 is connected by radial channels 84 and 85 in the base member 16 and the post 18 to an axial channel 86 in the post 18. The axial channel 86 is plugged at its upper end by any suitable means, such as a plug 87. Another radial channel 88 in the post 18 connects the axial channel 86 to an annular relief cut 89 in the lower base piece 60. Radial channels in the lower thrust-bearing assembly piece 60, such as the channel 90, are used to conduct the pressurized fluid to the upper and lower thrust-bearing surfaces of the thrust disc 79. The lower thrust-bearing surface of the thrust disc 79 is supplied by means of orifices, such as the orifice 91, connecting the radial channel 90 and the lower bearing space. Pressurized fluid is supplied to the upper bearing surface of the thrust disc 79 by an outer axial channel 82 in the thrust-bearing assembly pieces 60 and 62, connecting with a radial channel 94 in the upper base piece 62. The fluid is conducted to the upper thrust-bearing surface of the thrust disc 79 by orifices, such as the orifice 95.

The pressurized fluid is conducted from the upper and lower bearing spaces of the thrust disc 79 to the exhaust chamber 28 by means of a clearance space 97 between the cylindrical insert piece 76 and the upper assembly piece 62. A central radial channel 99 in the thrust disc 79 also is used to conduct the pressurized fluid from the thrust-bearing surfaces to the exhaust chamber 28. The pressurized fluid from the exhaust chamber 28 is conducted through an axial channel 103 cut in the cylindrical insert 76 between the exhaust chamber 28 and the hollow cavity of the shaft 10. The exhaust fluid may be used to cool the electric motor, not shown, and finally is exhausted into the atmosphere through an outlet port and an outlet connector 105.

The shaft 10 may be rotated by any suitable means, such as an electric motor, mounted in the space between an end cap 100 and the top portion of the shaft 10. The motor rotor is connected by any suitable means to the shaft 10. The rotor of the electric motor is elongated so that the rotor may be moved axially without distorting the motor field to any appreciable extent. Electric current is coupled to the electric motor by means of a cable 102.

During operation, the pressurized fluid is supplied continuously by suitable means to the base inlet port 83 to provide a film of air for the shaft 10 thrust-bearing surfaces, and to the inlet port 44 of the sleeve 12 to provide a film of air for the shaft 10 radial bearing surfaces. The pressurized fluid preferably is filtered before entering into the thrust-bearing inlet port 83 and the radial-bearing inlet port 44. A common source, not shown, may be used to supply the pressurized fluid.

In the absence of control fluid applied to the control chamber inlet port 33, the thrust-bearing assembly 14 is in its lower position against the lower-limit stop 32. At this time, the transducing means 48 is magnetically coupled to the uppermost track 56 on the shaft 10 for reading or for writing information. Pressurized fluid from the control port 33 is introduced into the control chamber 22 via a radial channel 106 and an axial channel 107 in the base support 16. The axial channel 107 connects the radial channel 106 with the control chamber 22. When pressurized fluid is introduced into the control inlet port 33, at any desired time, an upward force is applied to the thrust-bearing assembly 14 to position this assembly against the upper-limit stop 30. In this position of the assembly, the transducing means 48 magnetically couples to the lower track 54 on the shaft 10 for reading and writing information. After the pressurized fluid is removed from the control inlet port 33, the spring means 35 returns the thrust-bearing assembly 14 to its initial position against the lower limit stop 32. Any suitable means, such as a sliding or rotating valve means 110, externally connected between the control fluid inlet hose 31 and the control inlet port 33, may be used for exhausting air from the control chamber 22. Thus, when the spring means 35 returns the thrust bearing 14 to its initial, downward position, the fluid in the control chamber 22 is exhausted into the atmosphere via the control inlet port 33, the valve 110, and an exhaust hose 113.

The positioning of the shaft 10, and hence the selective coupling of the tracks thereon to the transducing means, may be controlled by any suitable means, for example, electromechanical means, as shown in FIG. 3. The apparatus of FIG. 3 is similar to that of FIGS. 1 and 2 except that a movable pin 114 is attached to the upper surface of the thrust-bearing assembly 14. The pin 114 is adapted to slide in an axial bearing means 116 fitted in a bored opening in the sleeve 12. The opening in the sleeve 12 preferably is air-tight. The amount of upward movement of the pin 114, and hence the position of the shaft 10, is controlled in discrete steps by means of three stops 118, 120 and 121, which correspond to the armatures of three solenoids 122, 124 and 126. The solenoids may be supported by any suitable means, not shown.

Three external stops provide for the positioning of any desired one of four tracks per transducing means. The fourth track of any group individual to any one transducing means is the uppermost track of that group. The uppermost track in each group is normally coupled to a different transducing means 48 in the absence of signals applied to the solenoid coils 130, 132 and 134, due to the action of the spring means 35 of FIGS. 1 and 2. For example, in the drawing of FIG. 3, the middle stop 120 is shown extended as by energizing the coil 132 of the middle solenoid 124. Upon deenergization of the solenoid coil 132, the spring means 35 returns the thrust-bearing assembly 14 to its initial condition against the lower-limit stop 32 of FIGS. 1 and 2. By applying signals selectively to the solenoid windings, any desired one of the stops 118, 120 and 121 may be used to limit the upward movement of the shaft 10 when the pressurized fluid is introduced into the control chamber 22 of FIGS. 1 and 2.

There has been described herein improved data storage apparatus which provides advantages, for example, in reducing the number of transducing means and the expensive auxiliary electronic equipment used with the transducing means.

What is claimed is:

1. In data-storage apparatus, the combination of a rotatable shaft having magnetizable material thereon, and transducing means for coupling to said material, with means including a movable thrust-bearing assembly for moving said shaft from an initial position axially in one direction during rotation thereof, a plurality of separate positioning means, each capable of positioning said shaft a different distance from said initial position, and means for selecting a desired one of said positioning means for stopping the movement of said shaft.

2. Data-storage apparatus comprising a first member having a magnetizable material thereon, a second member, transducing means fixed in said second member for magnetically coupling to said magnitizable material, a thrust-bearing assembly for supporting said first member rotatably with respect to said second member, a base member, a chamber including walls formed by said assembly and said base member, means for applying pressurized fluid to said chamber for expanding said chamber by moving said walls relative to each other axially in one direction, and spring means for moving said assembly and said first member to return said chamber to its initial condition.

3. Apparatus comprising a first member having a coating of magnetizable material thereon, a thrust-bearing assembly for supporting said first member rotatably with respect to a second member, means for moving said first member axially in one direction from an initial position to a desired one of a plurality of other positions, spring means for returning said first member to said initial position, and a plurality of transducing means mounted in said second member for magnetically coupling to said magnetizable material.

4. Apparatus comprising a rotatable member having a coating of magnetizable material thereon, another member around said rotatable member and providing a peripheral wall for directing a pressurized fluid around said rotatable member, a plurality of magnetic transducing means each mounted on said other member, in a different axial plane for magnetically coupling to different portions of said magnetizable material, a thrust-bearing assembly for supporting said rotatable member, a base member, a chamber including walls formed by said assembly and said base member, means for applying pressurized fluid to said chamber for expanding said chamber by moving said walls relative to each other axially in one direction, and spring means for returning said chamber to its initial position.

5. Apparatus comprising a fixed member, a movable shaft member having magnetizable material thereon, a fluid-bearing means for supporting said movable member, a base member, a chamber including walls formed by said fluid-bearing support means and said base member, means for supplying pressurized fluid to said chamber for expanding said chamber by moving said walls relative to each other thereby axially moving said shaft member from a first position to a second position, spring means for returning said shaft member to its initial position, and magnetic transducing means mounted in said fixed member for magnetically coupling to different portions of said magnetizable material when said shaft member is in different positions.

6. In data storage apparatus, the combination of a rotatable shaft having magnetizable material thereon, and transducing means for coupling to said material, with a sleeve member around said shaft, said tranducing means being mounted in said sleeve member, a pressurized fluid thrust-bearing assembly for supporting said shaft, and means for moving said shaft during rotation thereof axially in discrete steps within said sleeve member by desired amounts.

7. In data storage apparatus, the combination of a rotatable shaft having magnetizing material thereon, and transducing means for coupling to said material, with a sleeve member around said shaft, said transducing means being mounted in said sleeve member, a pressurized fluid thrust-bearing means for supporting said shaft, a pressurized fluid radial bearing between said shaft and sleeve member, and means for moving said shaft during rotation thereof axially in discrete steps within said sleeve member by desired amounts, said thrust-bearing means moving with said shaft.

8. In a recording device including a rigid magnetic drum rotatable at high speeds within a member surrounding and radially spaced minutely from the lateral surface of said drum, means for supplying fluid to provide a bearing medium between the said drum and said member, means for rotating said drum, transducer means arranged in said member for coacting with said drum to record data thereon, and means engaging said drum for selectively translating said drum axially within said member for rotation at a predetermined point to bring about random access relationship with said transducer means.

(References on following page)

References Cited

UNITED STATES PATENTS

| | | | |
|---|---|---|---|
| 807,708 | 12/1905 | Ammann et al. | 346—126 |
| 1,052,940 | 2/1913 | Morris | 346—126 |
| 1,259,591 | 3/1918 | Bedaux | 346—126 |
| 2,080,100 | 5/1937 | Tauschek | 340—174.1 |
| 2,416,445 | 2/1947 | Jensen | 179—100.20 X |
| 2,612,566 | 9/1952 | Anderson et al. | |
| 2,690,913 | 10/1954 | Rabinow. | |
| 2,787,750 | 4/1957 | Jones. | |
| 2,894,064 | 7/1959 | Cooley | 340—174 |
| 2,929,671 | 3/1960 | Taylor | 340—174.1 |
| 2,947,978 | 8/1960 | Poylo et al. | 346—74 X |

FOREIGN PATENTS

| | | | |
|---|---|---|---|
| 684,587 | 12/1952 | Great Britain. | |

BERNARD KONICK, *Primary Examiner.*

EVERETT R. REYNOLDS, IRVING L. SRAGOW, STEPHEN W. CAPELLI, WALTER W. BURNS, Jr., J. VANDENBURG, J. F. BURNS, R. JENNINGS, T. W. FEARS, *Assistant Examiners.*